Jan. 17, 1950     D. A. LUTON ET AL     2,494,952
FISHING REEL
Filed Oct. 5, 1945
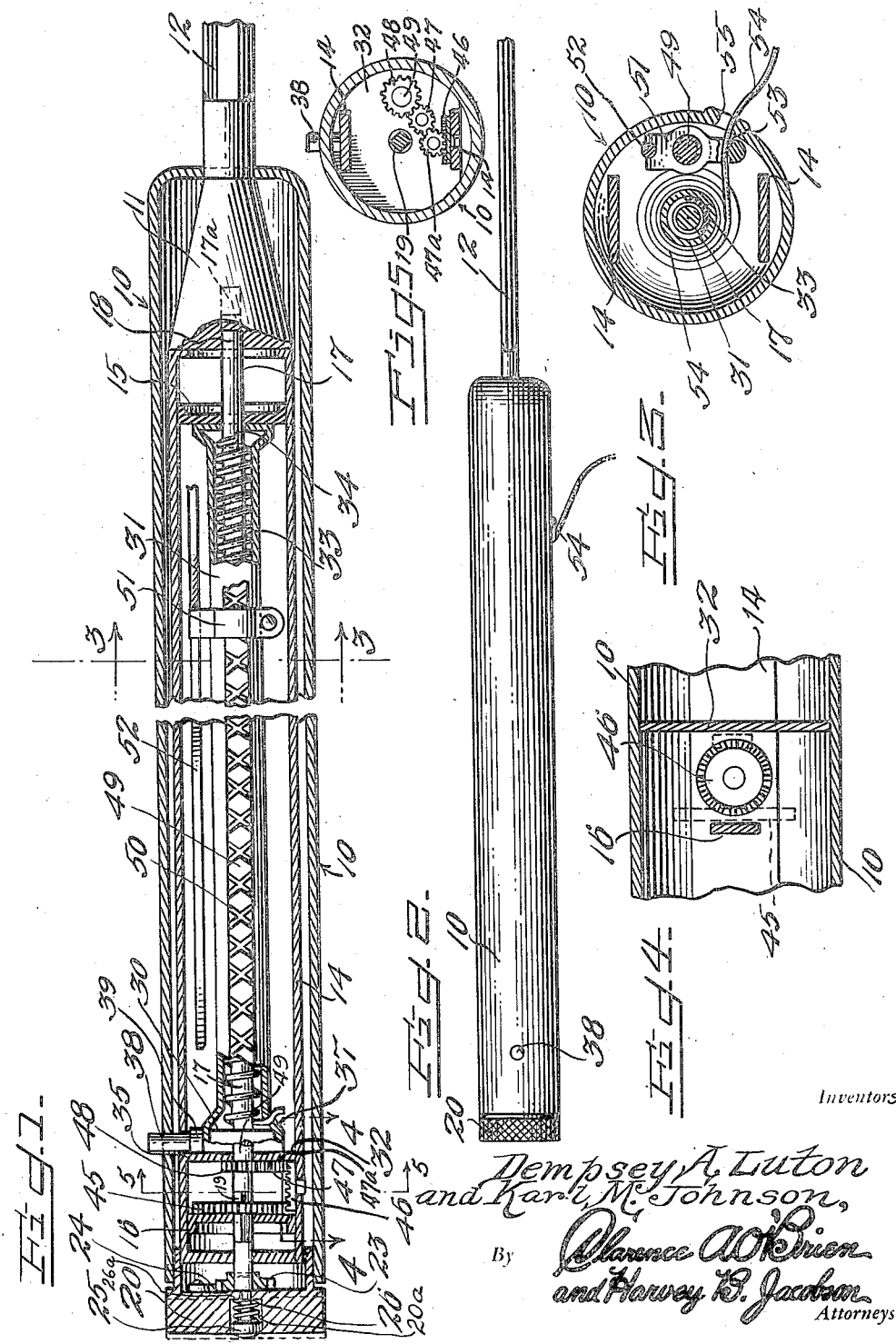
Inventors
*Dempsey A. Luton
and Karl M. Johnson,*
By *Clarence A. O'Brien
and Harvey B. Jacobson,*
Attorneys Patented Jan. 17, 1950

2,494,952

UNITED STATES PATENT OFFICE 2,494,952

FISHING REEL

Dempsey A. Luton and Karl M. Johnson,
Jackson, Wyo.

Application October 5, 1945, Serial No. 620,536

1 Claim. (Cl. 43—21)

This invention relates to a fishing reel and more particularly to such a reel adapted to be spring wound.

A primary object of this invention is the provision of an improved, completely self-contained fishing reel provided with means whereby, upon release of the brake, the reel may be substantially rewound, as when a fish strikes, or the like.

An additional object is the provision of such a reel provided with means whereby the spring tensioning the same may be readily rewound, as desired, with a minimum of effort.

A further object of the invention is the provision of such a reel provided with means whereby the line may be relatively simply and easily wound thereon by spring tension.

Other objects reside in the provision of such a device which will be sturdy and durable in construction, reliable and efficient in operation, and relatively simple and inexpensive to manufacture and assemble.

Still further objects will in part be obvious and in part be pointed out hereinafter as the description of the invention proceeds and shown in the accompanying drawing, wherein there is disclosed a preferred embodiment of this inventive concept.

In the drawings:

Figure 1 is a longitudinal sectional view of the reel of the instant invention, certain parts thereof being broken away, Figure 2 is a reduced side elevational view of the reel, Figure 3 is a sectional view taken substantially along the line 3—3 of Figure 1 as viewed in the direction indicated by the arrows, Figure 4 is a fragmentary sectional view taken substantially along the line 4—4 of Figure 1, as viewed in the direction indicated by the arrows, and Figure 5 is a transverse vertical sectional view taken substantially on the plane of section line 5—5 of Figure 1.

Referring now to the drawings in detail wherein, for the purpose of illustration, there is disclosed a preferred embodiment of the present invention, the numeral 10 represents a tubular housing or handle member within which is secured the conical extremity 11 of a fishing pole 12.

A bracket or frame 14 is received within the handle member 10 and one end of the frame 14 is suitably secured to the major end of the conical extremity 11.

Extending transversely across the frame 14, adjacent the rear end of the frame 14, is a bracket 16 that is centrally apertured to receive the rear end of a rotatable shaft 17. The forward end of the shaft 17 is journaled in a bracket 15 carried by the frame 14 and enters a recess 17a provided in the conical extremity 11.

A rotatable knob 20 is disposed at the rear end of the handle member 10 and includes a central bore 20a that slidably receives the head portion of a push button 25. The forward end of the push button 25 is suitably fixed to the rear end of the shaft 17. A coil spring 26 embraces the shank of the push button 25 and is biased between the head of the push button 25 and a shoulder or rib 26a on the inner wall of the bore 20a to urge the push button 25 and shaft 17 leftward as shown in Figure 1.

A ratchet 23 surrounds the shaft 17 and is adapted to be engaged by a pawl 24 mounted on the inner face of the knob 20 to hold the shaft 17 against rotation. By manually rotating the handle member 10, the pawl 24 will gravitate out of locking engagement with the ratchet 23, permitting rotation of the shaft 17. Also, by pushing the shaft 17 so that its forward end enters the forward portion of the recess 17a, the ratchet will clear the pawl to permit rotation of the shaft 17.

A plate 32 is fixed within the frame 14, adjacent the rear end of the frame, and includes a bearing ring or flange 30 on which there is journaled for rotation a drum-forming flange 37 at the rear end of a tubular housing 31. A coil spring 33 embraces the shaft 17 and is disposed within the housing 31. The rear end of the spring 33 is secured to the drum 37 and the forward end of the coil spring is fixed to the shaft 17 so that when the shaft is rotated relative to the housing 31, the spring will be tensioned.

A pin 38, slidably received in opposed or registering openings in the frame 14 and handle member 10, is provided with an enlarged inner end portion 39 that will bear against the drum-forming flange 37 to break the rotation of the tube 31 upon an inward pressure on the pin 38.

The shaft 17 is provided with a squared portion 19, adjacent the journal 16, that is received in a square opening provided in a gear 45. The gear 45 engages a cog gear 46 journaled on the frame 14 and the cog gear 46 engages a gear 47a journaled on the plate 32. The gear 47a engages a further gear 47 journaled on the plate 32 and this latest gear (47) engages a gear 48 mounted on the extremity of a shaft 49 provided with double helical grooves 50.

The ends of a substantially U-shaped guide rod 52 are suitably secured to the frame 14 and this guide rod slidably supports a traveller 51 having an edge that is received in the double helical grooves 50 to permit movement of the traveller 51 upon rotation of the shaft 49. The guide or traveller 51 has an aperture therein, as at 53, through which the line 54 is adapted to be passed. The line 54 is extended outwardly from the tube 10 through an aperture 55 provided in the handle member 10.

When it is desired to place the spring 33 in tension, the knob 20 is rotated and the friction brake 38 held in against the tube 31, which will cause the shaft 17 to rotate and place the spring 33 in tension. During this rotation of the shaft 17, the gear 45 will be rotated as well as the gears 46, 47a, 47 and 48, thereby imparting a rotation to the rod 39 and the travelling member 51 will move longitudinally of the rod 49.

When it is desired to cause the tube 31 to rotate, the spring 33 being in tension, it is merely necessary to press inwardly upon the push button 25, which will cause the shaft 17 to move to the right or forwardly, carrying with it the ratchet 23 which will pass over the pawl 24. After the ratchet 23 clears the pawl 24, and the brake 38 is released, both the shaft 17 and tube 31 will rotate (in opposite directions), the fishing line will be rewound upon the tube 31 and the travelling member 51 will move longitudinally upon the second shaft 49.

Should it be desirable to rotate the tube 31 without causing the shaft 17 to rotate, the knob 20 is rotated in a selected direction with the brake 38 forced against the flange 37 until the spring 33 is placed in tension. By then releasing the brake 38 and permitting the shaft 17 to be held against rotation by the pawl 24 or by the user holding the knob 20, it is apparent that the tube 31 will rotate, although the travelling member 51 will not move.

It should be noted that the tube 31 may be rotated in either a clockwise or counter-clockwise direction, depending on whether the knob 20 is rotated in a clockwise or counter-clockwise direction and if the pawl 24 is not applied correctly to prevent rotation of the shaft 17, the user may hold the knob 20 and still prevent rotation of the shaft 17.

We claim:

In a fishing rod, a handle having a recess therein, a frame in said recess, a first shaft extending longitudinally of said recess and journaled in said frame, a reel surrounding said first shaft, a spring surrounding said first shaft and housed within said reel, said spring being terminally connected to said shaft and reel, a second shaft in said recess journaled in the frame and having a double helical thread, a guide rod in said recess parallel to said second shaft, a line guiding traveler slidable on said guide rod and threadedly engaging said double helical thread, a gear fixed to said first shaft, a cog journaled in said frame and meshing with said gear, a flange constituting a brake drum on said reel, a friction brake means engageable with said drum, said friction brake means slidably carried by said frame and extending through said handle, external means for rotating said first shaft and tensioning said spring, and gear means operatively connecting said second shaft to said cog for rotation of said second shaft during rotation of said first shaft.

DEMPSEY A. LUTON.
KARL M. JOHNSON.

REFERENCES CITED

The following references are of record in the file of this patent:

UNITED STATES PATENTS

| Number | Name | Date |
|---|---|---|
| 259,935 | Smith | June 20, 1882 |
| 472,263 | Hill | Apr. 5, 1892 |
| 551,550 | Martin | Dec. 17, 1895 |
| 769,142 | Atkinson | Sept. 6, 1904 |
| 2,399,863 | Forestiere | May 7, 1946 |